US008390295B2

(12) United States Patent
Gorek et al.

(10) Patent No.: US 8,390,295 B2
(45) Date of Patent: Mar. 5, 2013

(54) METHOD AND APPARATUS FOR FOCUSING IN RESISTIVITY MEASUREMENT TOOLS USING INDEPENDENT ELECTRICAL SOURCES

(75) Inventors: Matthias Gorek, Lower Saxony (DE); Martin Folberth, Lower Saxony (DE); Christian Fulda, Lower Saxony (DE)

(73) Assignee: Baker Hughes Incorporated, Houston, TX (US)

( * ) Notice: Subject to any disclaimer, the term of this patent is extended or adjusted under 35 U.S.C. 154(b) by 461 days.

(21) Appl. No.: 12/171,401

(22) Filed: Jul. 11, 2008

(65) Prior Publication Data

US 2010/0007349 A1    Jan. 14, 2010

(51) Int. Cl.
*G01V 3/00*    (2006.01)

(52) U.S. Cl. ........ 324/373; 324/347; 324/357; 324/367; 324/368; 324/374; 324/375; 324/324; 324/354; 324/355; 324/366; 324/370; 175/50; 166/254.1; 166/254.2

(58) Field of Classification Search .................. 324/347, 324/357, 367, 368, 374, 375, 373, 324, 354, 324/355, 366, 370; 175/50; 166/254.1, 254.2
See application file for complete search history.

(56) References Cited

U.S. PATENT DOCUMENTS

| | | | |
|---|---|---|---|
| 3,096,477 A | | 7/1963 | Smith |
| 3,379,963 A | | 4/1968 | Saurenman |
| 3,882,376 A | | 5/1975 | Schuster |
| 4,087,741 A | * | 5/1978 | Mufti .......................... 324/366 |
| 4,412,180 A | * | 10/1983 | Desbrandes .................. 324/373 |
| 4,583,046 A | * | 4/1986 | Vinegar et al. ............... 324/373 |
| 4,686,477 A | * | 8/1987 | Givens et al. ................ 324/366 |
| 5,543,715 A | * | 8/1996 | Singer et al. ................. 324/368 |
| 6,025,722 A | | 2/2000 | Evans et al. |
| 6,373,254 B1 | | 4/2002 | Dion et al. |
| 6,426,625 B1 | * | 7/2002 | Samworth et al. ........... 324/373 |
| 6,488,085 B1 | * | 12/2002 | Milne et al. ................. 166/254.2 |
| 6,525,003 B2 | * | 2/2003 | Schlemmer et al. .......... 507/103 |
| 6,541,975 B2 | * | 4/2003 | Strack .......................... 324/323 |
| 6,603,314 B1 | * | 8/2003 | Kostelnicek et al. ......... 324/368 |
| 6,646,440 B1 | * | 11/2003 | Wittenberg .................. 324/323 |
| 7,026,820 B2 | * | 4/2006 | Xiao et al. ................... 324/339 |
| 7,141,981 B2 | * | 11/2006 | Folberth et al. .............. 324/334 |
| 7,256,582 B2 | * | 8/2007 | Gorek et al. .................. 324/373 |
| 7,874,359 B2 | * | 1/2011 | Bissonnette et al. ....... 166/254.2 |

(Continued)

OTHER PUBLICATIONS

D.H. Davies, et al. "Azimuthal Resistivity Imaging: A New-Generation Laterolog". SPE Formation Evaluation. Paper (SPE 24676). pp. 165-174. Sep. 1994.

*Primary Examiner* — Patrick Assouad
*Assistant Examiner* — Lamarr Brown
(74) *Attorney, Agent, or Firm* — Cantor Colburn LLP

(57) ABSTRACT

A system for measuring a resistivity parameter of an earth formation includes: at least one measurement electrode electrically connected to a first electrical source; at least one guard electrode; a shielding electrode interposed between the at least one guard electrode and the at least one measurement electrode, the shielding electrode being electrically connected to a second electrical source independent from the first electrical source, and the guard electrode being electrically connected to a third electrical source independent of the first and second electrical sources; at least one return electrode; insulators positioned between (i) the measurement electrode and the shielding electrode, (ii) the shielding electrode and the guard electrode and (iii) the measurement electrode, the guard electrode and the return electrode; and a processor configured to adjust at least one of the first electrical source and the second electrical source to minimize a current flow through the shielding electrode.

20 Claims, 5 Drawing Sheets

U.S. PATENT DOCUMENTS

| | | | |
|---|---|---|---|
| 7,928,733 B2* | 4/2011 | Gorek et al. | 324/364 |
| 8,087,461 B2* | 1/2012 | Fitzgerald | 166/254.2 |
| 8,115,490 B2* | 2/2012 | Gorek et al. | 324/364 |
| 2001/0038287 A1* | 11/2001 | Amini | 324/341 |
| 2002/0177954 A1* | 11/2002 | Vail, III | 702/7 |
| 2003/0038634 A1* | 2/2003 | Strack | 324/323 |
| 2003/0122547 A1* | 7/2003 | Prammer | 324/368 |
| 2003/0164706 A1* | 9/2003 | Iwanicki et al. | 324/375 |
| 2005/0206385 A1* | 9/2005 | Strack et al. | 324/347 |
| 2006/0017442 A1* | 1/2006 | Folberth | 324/334 |
| 2006/0238202 A1* | 10/2006 | Gorek et al. | 324/373 |
| 2007/0029083 A1* | 2/2007 | Folberth | 166/254.2 |
| 2007/0236222 A1* | 10/2007 | Gorek et al. | 324/356 |
| 2008/0210420 A1* | 9/2008 | Ramakrishnan et al. | 166/250.02 |
| 2008/0272789 A1* | 11/2008 | San Martin et al. | 324/355 |
| 2008/0297161 A1* | 12/2008 | Gorek | 324/342 |
| 2009/0107725 A1* | 4/2009 | Christy et al. | 175/50 |
| 2009/0302854 A1* | 12/2009 | Forgang et al. | 324/355 |
| 2009/0306896 A1* | 12/2009 | Forgang et al. | 702/7 |
| 2009/0309591 A1* | 12/2009 | Goodman et al. | 324/303 |
| 2010/0019772 A1* | 1/2010 | Gorek | 324/355 |
| 2010/0193186 A1* | 8/2010 | Smith | 166/254.2 |
| 2010/0231225 A1* | 9/2010 | Morys et al. | 324/366 |
| 2011/0088895 A1* | 4/2011 | Pop et al. | 166/254.2 |
| 2011/0221883 A1* | 9/2011 | Johnston | 348/85 |

* cited by examiner

METHOD AND APPARATUS FOR FOCUSING IN RESISTIVITY MEASUREMENT TOOLS USING INDEPENDENT ELECTRICAL SOURCES

BACKGROUND

Many resistivity sensors used in formation evaluation (FE) logging processes utilize a focusing technique, in which a guard electrode emits current in order to lead the current beam of a measurement electrode deeper into a conductive material. For these focused sensors, the driving potential on the guard and the measurement electrode must be exactly the same to avoid disturbances of the ideal electrical field, which makes sure that the focusing effect takes place. Driving potential differences may lead to currents flowing between the guard and the measurement electrode, which would completely destroy the focusing effect and lead to high measurement errors if not considered. An example of a focused sensor is described in U.S. Pat. No. 6,025,722 entitled "Azimuthally segmented resistivity measuring apparatus and method".

Other focused resistivity devices utilize a shielding electrode to improve focusing. An example of a resistivity device utilizing a shielding electrode is described in U.S. Pat. No. 7,256,582 entitled "Method and apparatus for improved current focusing in galvanic resistivity measurement tools for wireline and measurement-while-drilling applications". Such devices have limitations in the ability to focus, thus leading to limited penetration depths. Furthermore, typical devices utilize a single voltage source that supplies the measurement and shielding electrode, which may also limit the focusing ability of the device and/or limit the ability to precisely control the driving potential applied to the measurement electrode and the shielding electrode.

SUMMARY

Disclosed herein is a system for measuring a resistivity parameter of an earth formation. The system includes: at least one measurement electrode that emits a measurement current into the formation, the measurement electrode being electrically connected to a first electrical source; at least one guard electrode that emits a guard current for focusing the measurement current; a shielding electrode interposed between the at least one guard electrode and the at least one measurement electrode, the shielding electrode being electrically connected to a second electrical source independent from the first electrical source, and the guard electrode being electrically connected to a third electrical source independent of the first and second electrical sources; at least one return electrode for receiving current emitted from at least one of the measurement electrode, the shielding electrode and the guard electrode; insulators positioned between (i) the at least one measurement electrode and the shielding electrode, (ii) the shielding electrode and the at least one guard electrode and (iii) the at least one measurement electrode, the at least one guard electrode and the return electrode; and a processor configured to adjust at least one of the first electrical source and the second electrical source to minimize a current flow through the shielding electrode.

Also disclosed herein is a method of measuring a resistivity parameter of an earth formation. The method includes: emitting a measurement current into the earth formation by applying a first electrical source to a measurement electrode; focusing the measurement current by applying a guard current to a guard electrode via a second electrical source; shielding the measurement electrode from the guard electrode by applying a third electrical source to a shielding electrode interposed between the measurement electrode and the guard electrode, the third electrical source being independent from the first electrical source and the second electrical source; adjusting at least one of a current and a voltage supplied by at least one of the first electrical source, the second electrical source and the third electrical source to minimize a current flow through the shielding electrode; and determining a parameter related to a resistivity of the earth formation based on a current through the measurement electrode.

Further disclosed herein is a computer program product including machine readable instructions stored on machine readable media. The instructions are for measuring a resistivity parameter of an earth formation, by implementing a method including: emitting a measurement current into the earth formation by applying a first electrical source to a measurement electrode; focusing the measurement current by applying a guard current to a guard electrode via a second electrical source; shielding the measurement electrode from the guard electrode by applying a third electrical source to a shielding electrode interposed between the measurement electrode and the guard electrode, the third electrical source being independent from the first electrical source and the second electrical source; adjusting at least one of a current and a voltage supplied by at least one of the first electrical source, the second electrical source and the third electrical source to minimize a current flow through the shielding electrode; and determining a parameter relating to a resistivity of the earth formation based on a current through the measurement electrode.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed system and method are presented herein by way of exemplification and not limitation with reference to the Figures.

Figure 1:
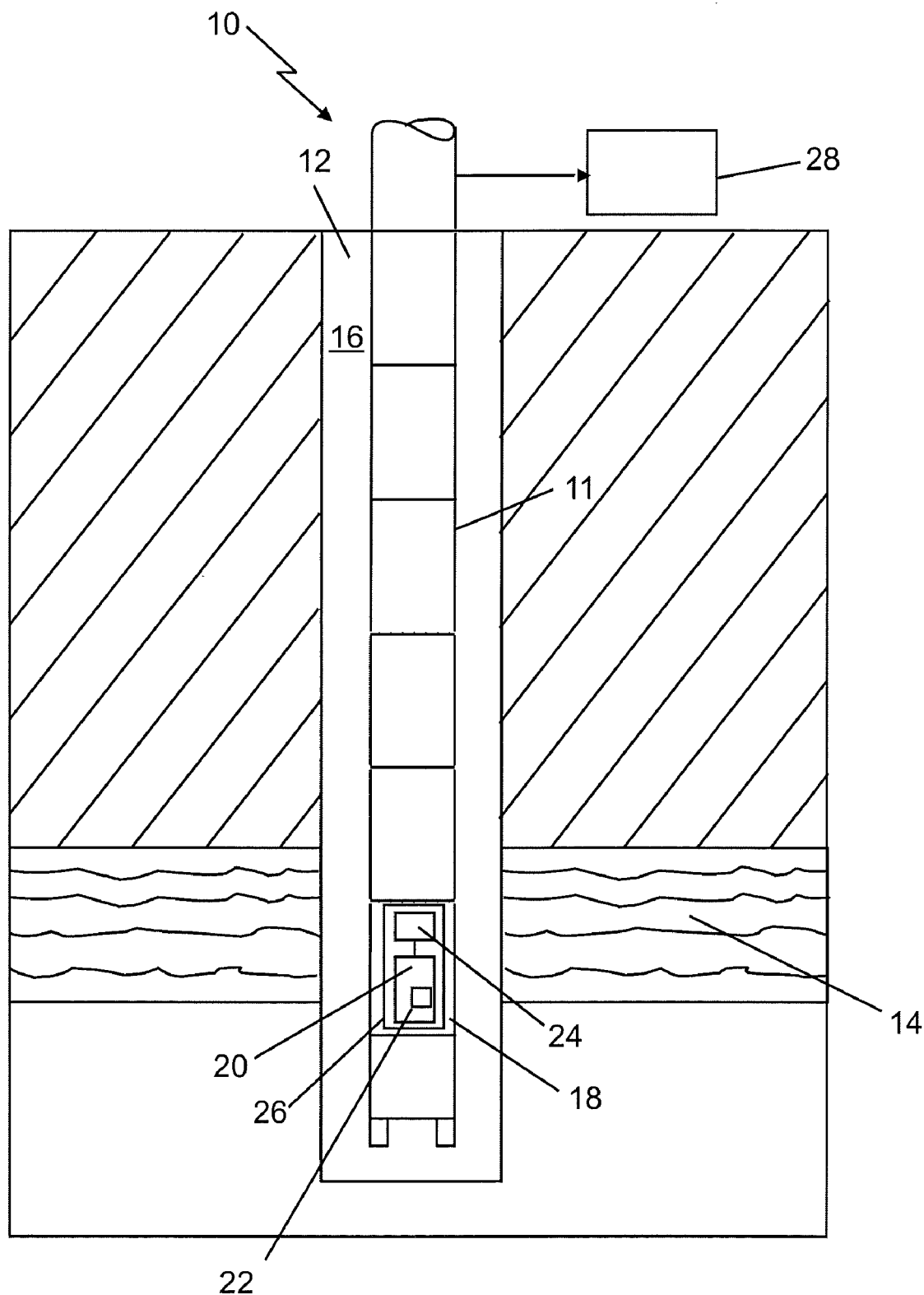
FIG. 1 depicts an exemplary embodiment of a logging system.

Referring to FIG. 1, an exemplary embodiment of a well logging system 10 includes a drillstring 11 that is shown disposed in a borehole 12 that penetrates at least one earth formation 14 for making measurements of properties of the formation 14 and/or the borehole 12 downhole. Drilling fluid, or drilling mud 16 may be pumped through the borehole 12. As described herein, "formations" refer to the various features and materials that may be encountered in a subsurface environment. Accordingly, it should be considered that while the term "formation" generally refers to geologic formations of interest, that the term "formations," as used herein, in some instances, includes any geologic points or volumes of interest (such as a survey area). As described herein, "logging" refers to the taking of formation property measurements. Examples of logging processes include measurement-while-drilling (MWD) and logging-while-drilling (LWD) processes, during which measurements of properties of the formations and/or the borehole are taken downhole during or shortly after drilling. The data retrieved during these processes may be transmitted to the surface, and may also be stored with the downhole tool for later retrieval. Other examples include logging measurements after drilling, wireline logging, and drop shot logging. As referred to herein, "downhole" or "down a borehole" refers to a location in a borehole away from a surface location at which the borehole begins.

A downhole formation evaluation (FE) tool 18 is configured to be disposed in the well logging system 10 at or near the downhole portion of the drillstring 11, and includes various sensors or receivers 20 to measure various properties of the formation 14 as the tool 18 is advanced down the borehole 12. Such sensors 20 include, for example, nuclear magnetic resonance (NMR) sensors, resistivity sensors, porosity sensors, gamma ray sensors, seismic receivers and others.

In one embodiment, the tool 18 may be inserted in the drillstring 11, and allowed to fall by gravity to a downhole position, or be pumped to the downhole position via the mud 16. In other embodiments, the tool 18 may be lowered by a wireline, inserted during a MWD or LWD process, or inserted downhole by any other suitable processes.

The tool 18 may also include a downhole clock 22 or other time measurement device for indicating a time at which each measurement was taken by the sensor 20. The tool 18 may further include an electronics unit 24. The sensor 20 and the downhole clock 22 may be included in a common housing 26. The electronics unit 24 may also be included in the housing 26, or may be remotely located and operably connected to the sensor 20 and/or the downhole clock 22. With respect to the teachings herein, the housing 26 may represent any structure used to support at least one of the sensor 20, the downhole clock 22, and the electronics unit 24.

The tool 18 may be operably connected to a surface processing unit 28, which may act to control the sensor 20 and/or the tool 18, and may also collect and process data generated by the sensor 20 during a logging process.

The surface processing unit 28 and/or the tool 18 may also include components as necessary to provide for processing of data from the tool 18. Exemplary components include, without limitation, at least one processor, storage, memory, input devices, output devices and the like. As these components are known to those skilled in the art, these are not depicted in any detail herein.

The tool 18 may be equipped with transmission equipment to communicate ultimately to the processing unit 28. Connections between the tool 18 and the surface processing unit 28 may take any desired form, and different transmission media and methods may be used. Examples of connections may include wired, fiber optic, wireless connections or mud pulse telemetry.

Figure 2:
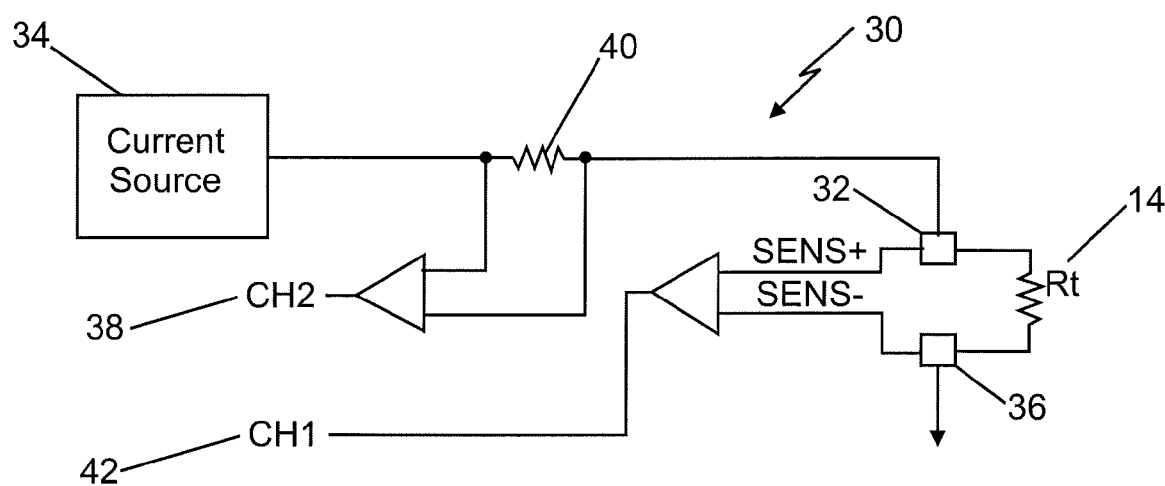
FIG. 2 depicts a circuit diagram of an exemplary embodiment of a sensor for measuring resistivity.

Referring to FIG. 2, in one embodiment, the sensor 20 is a resistivity sensor. Resistivity sensors normally operate as inductive sensors or galvanic sensors. One type of resistivity sensor is a galvanic resistivity sensor, an example of which is shown in FIG. 2, which is galvanically coupled directly to the earth formation with its electrodes. One type of resistivity sensor measures formation resistivity by passing an electrical current between a current source electrode on the sensor and a current return electrode, and measuring electrical potential differences between the electrodes. The resulting voltage/current (V/I) ratios are converted to apparent resistivities, using algorithms based upon the electrode array geometries and potential theory. Galvanic resistivity logs are useful, for example, for characterizing stratigraphy, making correlations between wells and inferring formation porosity. An embodiment of a galvanic resistivity sensor is shown in FIG. 3, which includes measurement and shielding electrodes that are each connected to independent electrical sources.

An example of a galvanic resistivity sensor is shown via the circuit diagram 30 in FIG. 2. A measurement electrode 32 injects a measurement current into the formation 14 represented by the resistance "$R_t$". The measurement current is supplied by a current source 34. The current from the formation 14 returns through a return, i.e., ground, electrode 36. Typically, a voltage drop 38 across a resistor 40 in the circuit 30 is measured and used to calculate the measurement current. By measuring a voltage drop 42 between the measurement electrode 32 and the return electrode 36, information is derived about the impedance encountered by the current between the measurement electrode 32 and the return electrode 36.

In some embodiments, the resistivity sensor is a galvanic resistivity measurement tool that uses a focusing technique, in which a guard electrode emits current in order to lead the current beam of a measurement electrode deeper into a conductive material. Such a sensor is useful especially for high resistivity formations that are measured via boreholes having relatively low resistivity drilling mud therein. The focused resistivity sensors counteract the tendency of the current emitted by the measurement electrode to flow into the low resistivity mud. The guard electrode(s), which are configured to have the same voltage potential as the measurement electrode, oppose borehole current flow and force the current from the measurement electrode to flow outward into the surrounding formation, thereby increasing penetration depths relative to non-focused sensors.

Figure 3:
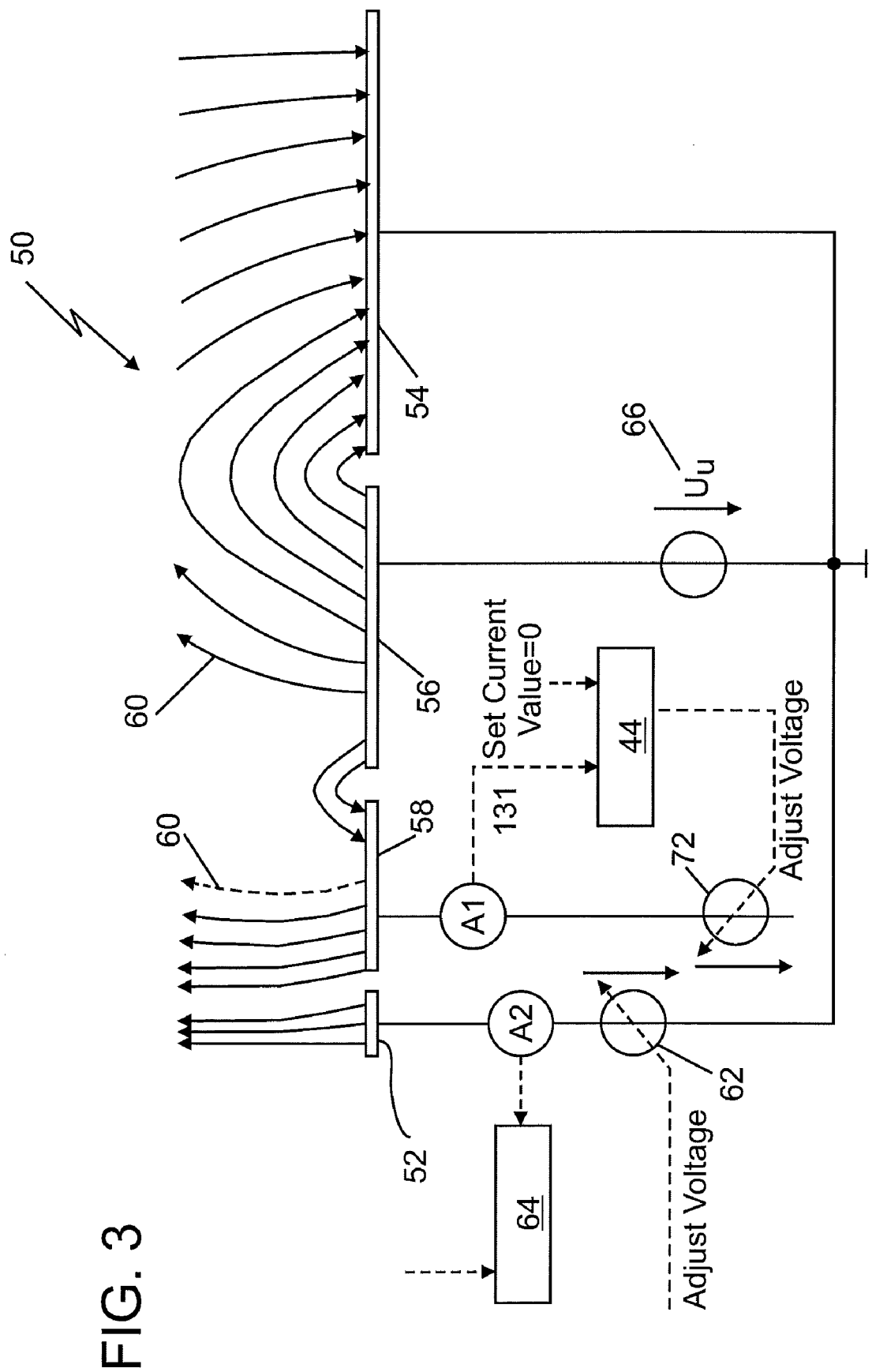
FIG. 3 depicts an exemplary embodiment of a focused resistivity sensor including a shielding electrode.

Referring to FIG. 3, an embodiment of a focused resistivity sensor 50 is shown. The resistivity sensor 50 includes a measurement electrode 52 and a return electrode 54. A guard electrode 56 is located between the measurement electrode 52 and the return electrode 54 and is connected to a guard electrical source 66. A shielding electrode 58 is located between the measurement electrode 52 and the guard electrode 56. Although specific numbers of electrodes are described herein, any number of electrodes may be utilized.

The sensor 50 includes a plurality of electrical sources for independently adjusting the current or voltage supplied to the measurement electrode 52 and the shielding electrode 58. In one embodiment, the electrical sources described herein are voltage sources. In other embodiments, the electrical sources are current sources. The sensor 50 includes the measurement electrode 52, the return electrode 54, the guard electrode 56 and the shielding electrode 58. In this embodiment, each of the measurement electrode 52, the shielding electrode 58 and the guard electrode 56 are independently coupled to a respective current or voltage source. For example, the measurement electrode 52 is electrically connected to the first voltage source 62 that is controlled by the first controller 64, and the shielding electrode 58 is electrically connected to a second voltage source 72 that is independent from the first voltage source 62 and is controlled by a shield controller 74. A current meter A2 is connected to the measurement electrode 52, and a current meter A1 is connected to the shielding electrode 58. Although each voltage source 62, 66 and 72, in one embodiment, is controlled by a separate controller, the voltage sources 62, 66 and 72 may be controlled by a single controller or any combination of controllers. Furthermore, although the electrical sources described herein are voltage sources, in other embodiments, the electrical sources are current sources.

The measurement current emitted by the measurement electrode 52 and other electrodes may be of any suitable frequency. Such suitable frequencies may range between, for example, direct current and frequencies on the order of light spectrum frequencies. In one embodiment, a maximum phase difference between selected electrodes may also be specified.

If an electrical field 60 inside the mud 16 and/or the formation 14 is not ideal, i.e., there is a voltage difference between the measurement electrode 52 and the guard electrode 56, current will flow in the shielding electrode 58, which is measured by the current meter A1. The controllers, in response to detecting a current via meter A1, adjust one or more of the voltage sources 62, 66 and 72 until the current through the meter A1 is zero. As a result of this adjustment, current emitted from the guard electrode 56 will not enter the measurement electrode 52.

Figure 4:
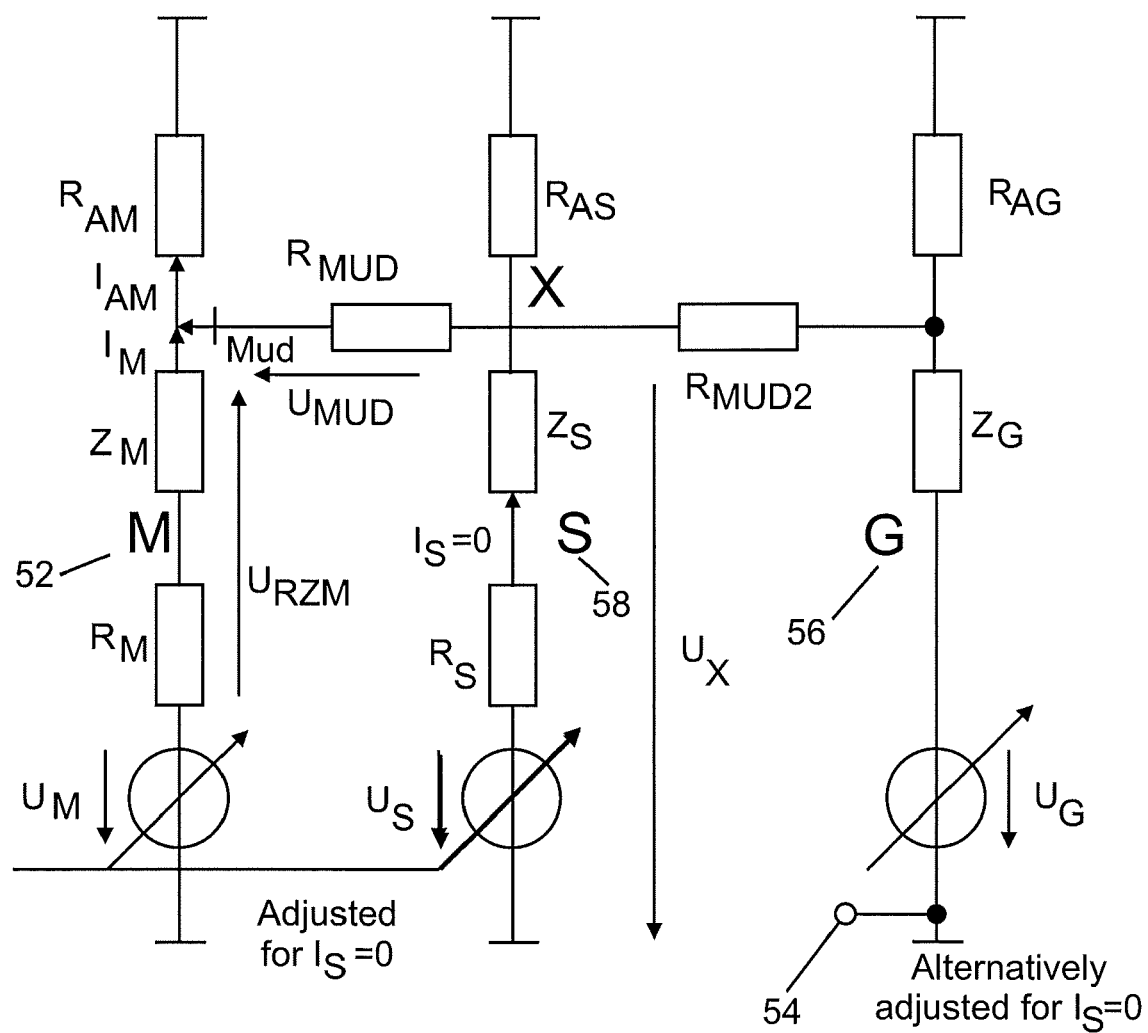
FIG. 4 depicts a circuit diagram of the sensor of FIG. 3.

Referring to FIG. 4, in order to provide an improved focusing effect, the voltages applied to the electrodes 52, 58, 56 are maintained so that the current $I_S$ through the shielding electrode is minimized or zero. In one embodiment, this is accomplished by maintaining the measurement electrode 52 and the shielding electrode 58 at the same voltage, either by keeping the voltages constant or varying them both simultaneously. Accordingly, the ability to independently adjust the voltage sources 62 and 72 allows the electrodes 52, 58 to be maintained easily at the same voltage. In this way, any of the voltage sources may be independently adjusted to maintain $I_S$ at zero.

The measurement electrode 52, referred to in this example as "M", is provided with the guard electrode 56, referred to in this example as "G". "$U_M$" and "$U_S$" and "$U_G$" are applied voltages from the voltage sources 62, 72 and 66, respectively. "$R_M$" is the resistance of the measurement electrode 52, and "$R_S$" is the resistance of the shielding electrode 58. "$R_M$" represents the insertion resistance of a current measurement device such as meter A2 measuring the current flow in the measurement electrode 52 connection, and "$R_S$" represents the likewise resistance for the shielding electrode 58. The resistance $R_M$ includes the combined resistance of meter A2, contacts and other components of the measurement electrode 52, and the resistance $R_S$ includes the combined resistance of the meter A1, contacts and other components of the shielding electrode 58. $Z_M$, $Z_S$ and $Z_G$ are the contact impedances related to the measurement electrode 52, the shielding electrode 58 and the guard electrode 56, respectively. $R_{AM}$, $R_{AS}$ and $R_{AG}$ are apparent formation resistances for the measurement electrode 52, the shielding electrode 58 and the guard electrode 56, respectively. $R_{AM}$ may be calculated from the measured current and potential of the electrode 52, if the controlling condition $I_S=0$ is fulfilled. The measurements to determine the other resistances $R_{AS}$ and $R_{AG}$ are influenced by parallel resistances. The apparent resistance $R_{AM}$ and $R_{AG}$ may be used to generate an apparent resistivity which in turn is used to derive a resistivity of the earth formation. "$U_{RZM}$" is the voltage drop across the measurement electrode current measuring resistance $R_M$ and the contact impedance $Z_M$. "$R_{MUD}$" is the mud resistance between the measurement electrode 52 and the shielding electrode 58 and $R_{MUD2}$ is the mud resistance between the shielding electrode 58 and the guard electrode 56. "$I_{MUD}$" is a current in the mud between the location X and the corresponding location between $Z_M$, $R_{MUD}$ and $R_{AM}$ in the instance that voltages at these positions are unequal, resulting in a potential difference "$U_{MUD}$". "$I_M$" is the current on the measurement electrode 52, and "$I_{AM}$" is the current applied from the measurement electrode 52 into the formation 14. "X" is a location inside the mud 16 beyond an impedance layer adjacent to the shielding electrode 58.

"$U_X$" is a voltage between the location X and the return 54. A degree of focusing may be achieved by maintaining a current "$I_S$" through the shielding electrode 58, i.e., through the location defined as the shielding electrode 58 in FIG. 4, at zero by adjusting the voltage supplied to the measurement electrode 52, the shielding electrode 58, and/or the guard electrode 56.

In one embodiment, the measurement electrode 52 and the shielding electrode 58 are supplied with voltages of the same level and the current passing from the second voltage source 72 to the shielding electrode 58 is maintained at zero by adjusting the voltage(s) supplying the guard electrode 56, or by adjusting the measurement electrode 52 and the shielding electrode 58 voltages simultaneously. In this way, current flowing between the measurement electrode 52 and the guard electrode 56 is minimized or eliminated, thereby improving the focusing of the current $I_{AM}$.

Assuming $I_S=0$, the following relationships are true:

$$U_S=U_X=U_{MUD}-U_{RZM}+U_M;$$

$$I_{MUD}=I_{AM}-I_M;$$

$$U_{RZM}=I_M*(ZM+RM); \text{ and}$$

$$U_{MUD}=I_{MUD}*R_{MUD}.$$

Using these relationships, the applied voltage $U_S$ can be calculated as follows:

$$U_S=U_M-(R_M+Z_M)*I_M+R_{MUD}*(I_{AM}-I_M).$$

The current $I_M$ can thus be shown in the following equation:

$$I_M=(U_M+R_{MUD}*I_{AM}-U_S)/(R_M+Z_M+R_{MUD}).$$

As can be seen from the above equation, $I_M>0$ if $U_M+R_{MUD}*I_{AM}>U_S$. Accordingly, for $U_M=U_S$, when the applied voltages to the measurement electrode 52 and the shielding electrode 58 are the same, no current from the guard electrode 56 may penetrate the measurement electrode 52.

In one embodiment, the measurement electrode 52 and the shielding electrode 58 are configured as a shielded measurement electrode (SME). The SME includes a measurement electrode of arbitrary form surrounded by an isolation, which is surrounded by the shielding electrode. The shielding electrode is also surrounded by isolation.

In one embodiment, the sensor 20 may be configured in any of various configurations, for example, in conjunction with a tool, MWD device and/or bottomhole assembly. In one example, the sensor 20 is equipped with one or more full or partial guard electrodes 56 of arbitrary form, which may be operated on different constant potentials. Each guard electrode 56 may be equipped with one or more SMEs. In one embodiment, each of the partial guard electrodes 56 is surrounded by an isolator to isolate the guard from the return.

Figure 5:
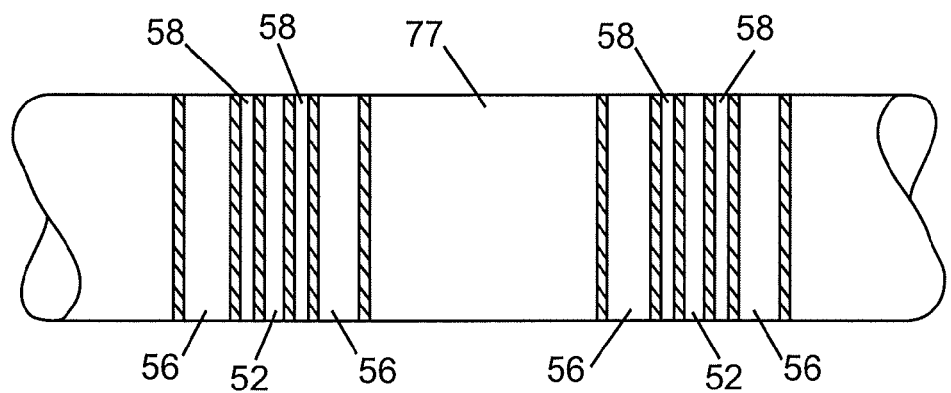
FIG. 5 depicts another exemplary embodiment of a focused resistivity sensor including a shielding electrode.

Referring to FIG. 5, in one example, a tool body 77 is equipped with several groups of ring electrodes. Each group consists of an inner measurement electrode ring 52 which is surrounded by two shielding electrode rings 58 that are shorted. The shielding electrode rings 58 are surrounded by two shorted guard electrode rings 56. The different sets of shorted guard electrodes 56 may be operated on different constant potentials. In one embodiment, the pairs of shielding electrodes 58 and the pairs of guard electrodes 56 are not shorted. The number of shielding electrodes 58 and guard electrodes 56 surrounding the electrode 52 is not limited, and may be any suitable number desired to achieve a desired focusing effect.

Figure 6:
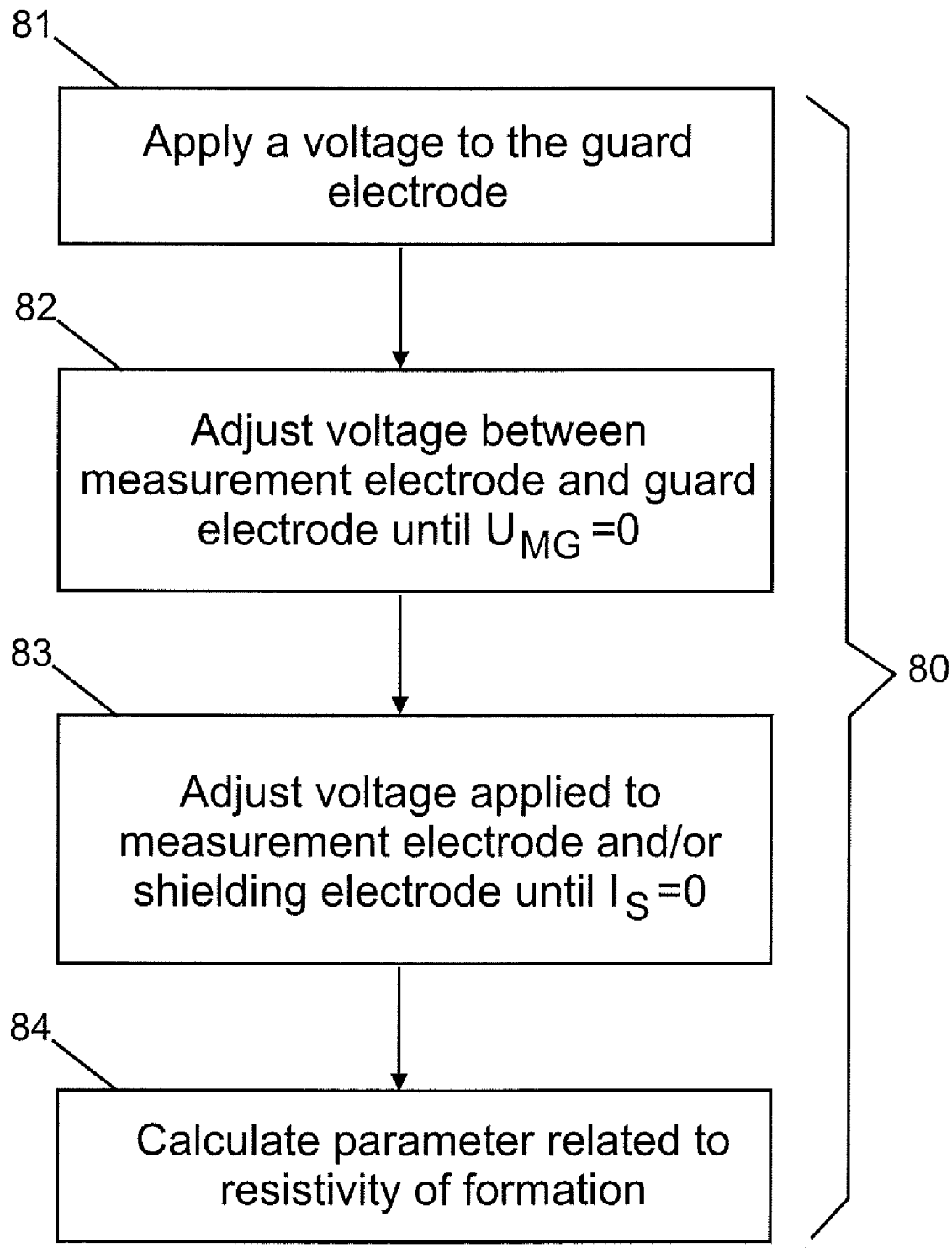
FIG. 6 depicts a flow chart providing an exemplary method for measuring resistivity of an earth formation.

FIG. 6 illustrates a method 80 for measuring resistivity in an earth formation. The method 80 includes one or more stages 81-84. The method 80 is described herein in conjunction with the sensor 20, although the method 80 may be performed in conjunction with any number and configuration of receivers, sensors, processors or other measurement tools. In one embodiment, the method 80 includes the execution of all of stages 81-84 in the order described. However, certain stages may be omitted, stages may be added, or the order of the stages changed. Furthermore, the method 80 may be performed in conjunction with wireline measurement processes, LWD or MWD processes, and any other suitable measurement or other logging processes.

In the first stage 81, a voltage $U_G$ is applied at the guard electrode 56.

In the second stage 82, a voltage $U_{MG}$ between the measurement electrode 52 and the guard electrode 56 is adjusted as needed (for example, by varying the voltage $U_M$ and/or $U_G$) until the voltage $U_{MG}$ goes to zero.

In the third stage 83, the electrical sources 62 and/or 72 are adjusted as needed to reduce the shielding electrode current $I_S$ to zero. In one embodiment, the voltage applied to the guard electrode 56 is maintained at a constant value while the electrical sources 62 and/or 72 are adjusted. In another embodiment, the electrical sources 62 and 72 are adjusted as needed to maintain the driving potential to the measurement electrode 52 and the shielding electrode 58 at an equal value. The electrical sources 62 and 72 may be maintained at an equal driving potential, and the electrical source 66 supplying the guard electrode 56 may be maintained at a driving potential greater than the driving potential of the electrical sources 62 and 72 ($U_G > U_S = U_M$).

Various methods of achieving zero current through shielding electrode 58 are utilized. The driving potential or current supplied by the first and second electrical sources 62, 72 is adjusted to minimize or eliminate a current flow through the shielding electrode. In one example, the electrical source 62 and/or 72 is controlled. In another embodiment, the current from a current source, independently applied to the measurement electrode 52 and the shielding electrode 58, is controlled. In another embodiment, the driving potential applied to the measurement electrode 52 and the shielding electrode 58 is maintained at an equal value to minimize or eliminate current flow through the shielding electrode 58.

In one embodiment, the current "$I_S$" through the shielding electrode 58 is measured, such as by meter A1, and at least one of the electrical sources 62, 66 and 72 are adjusted to maintain the current $I_S$ at zero or at a minimal value.

In one embodiment, the driving potentials of the first and second electrical sources 62, 72 are maintained at an equal value. The first and second electrical sources 62, 72 are simultaneously adjusted (so that they maintain equal driving potentials), and/or the third electrical source 66 is adjusted, to maintain the current $I_S$ at zero or at a minimal value.

In the fourth stage 84, a parameter related to a resistivity of the formation, such as the apparent resistivity $R_{AM}$, is then calculated from the current through the measurement electrode 52 and the voltage between the measurement electrode 52 and the return electrode 54. Other parameters include the current through the measurement electrode 52, a resistance of the measurement electrode 52, an apparent resistance of the formation, and a resistivity of the formation.

Since in at least one embodiment $I_S$ is zero, the potential difference between the measurement electrode 52 and the location X in the mud vanishes and therefore no net current flow occurs from the measurement electrode 52 to the location X or vice versa. The sum of the currents from the measurement electrode 52 through $Z_M$ and from X through $R_{MUD}$ will flow through $R_{AM}$ (i.e., the resistor formed by the formation 14), and accordingly, minimal or no current from the measurement electrode 52 is lost to the mud 16.

Although the present embodiment provides the surface processing unit 28 and/or the electronics unit 24 to receive data and control the sensors 20 and 50, any number or types of processors, circuits or devices for controlling operation of the sensors 20 and 50 and/or processing of data may be provided. Such devices may include any suitable components, such as storage, memory, input devices, output devices and others.

In one embodiment, the methods described herein may be used in a system that operates in real time or near real time in order to provide timely information to personnel at the site of a formation. In another embodiment, the information is recorded and later processed via, for example, the surface processor 28. "Real-time" data, in one embodiment, refers to data transmitted to a processor upon or shortly after detection and/or recordation by one or more sensors 20.

The apparatuses and methods described herein provide various advantages over existing processing methods and devices, in that they provide for independent control of voltages applied to the measurement electrode and the shielding electrode, to allow for more precise control, and accordingly more effective focusing of currents applied to a formation, than prior art devices.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for measuring a resistivity parameter of an earth formation, the device comprising:
   at least one measurement electrode that emits a measurement current into the formation, the measurement electrode being electrically connected to a first electrical source that is configured to apply at least one of a current and a voltage to the measurement electrode;
   at least one guard electrode that emits a guard current for focusing the measurement current;
   a shielding electrode interposed between the at least one guard electrode and the at least one measurement electrode, the shielding electrode being electrically connected to an electric measuring device for measuring current in the shielding electrode and electrically connected to a second electrical source that is configured to apply at least one of a current and a voltage to the shielding electrode, the second electrical source independent from the first electrical source, the first and second electrical sources being adjustable in response to a current measured by the electric measuring device, and the guard electrode being electrically connected to a third electrical source independent of the first and second electrical sources;
   at least one return electrode for receiving current emitted from at least one of the measurement electrode, the shielding electrode and the guard electrode;
   insulators positioned between (i) the at least one measurement electrode and the shielding electrode, (ii) the shielding electrode and the at least one guard electrode and (iii) the at least one measurement electrode, the at least one guard electrode and the return electrode; and
   a processor configured to independently adjust the first electrical source and the second electrical source in response to a current measured by the electric measuring device to minimize a current flow through the shielding electrode.

2. The apparatus of claim 1, wherein the processor is configured to maintain the first electrical source and the second electrical source at an equal applied voltage.

3. The apparatus of claim 1, wherein electrode voltages with respect to the return electrode are direct current (DC) voltages and respective currents are direct currents.

4. The apparatus of claim 3, wherein electrode voltages with respect to the return electrode are alternating current (AC) voltages and respective currents are alternating currents.

5. The apparatus of claim 1, wherein the processor is configured to adjust at least one of the first electrical source, the second electrical source and the third electrical source to minimize a current flow through the shielding electrode.

6. The apparatus of claim 1, wherein the first electrical source and the second electrical source are selected from at least one of a current source and a voltage source.

7. The apparatus of claim 1, wherein the processor is configured to calculate a parameter related to a resistivity of the earth formation based on the current through the measurement electrode.

8. The apparatus of claim 7, wherein the parameter is selected from the current through the measurement electrode, a resistance of the measurement electrode, an apparent resistivity of the formation, and a resistivity of the formation.

9. The apparatus of claim 1, wherein the processor is at one of (i) a surface location, and, (ii) a downhole location.

10. A method of measuring a resistivity parameter of an earth formation, the method comprising:
    emitting a measurement current into the earth formation by applying a first electrical source to a measurement electrode;
    focusing the measurement current by applying a guard current to a guard electrode via a second electrical source;
    shielding the measurement electrode from the guard electrode by applying a third electrical source to a shielding electrode interposed between the measurement electrode and the guard electrode, the shielding electrode connected to an electric measuring device, the third electrical source being electrically connected to the shielding electrode and independent from the first electrical source and the second electrical source;
    independently adjusting at least one of a current and a voltage supplied by the first electrical source and the second electrical source in response to a current in the shielding electrode measured by the electric measuring device to minimize a current flow through the shielding electrode; and
    determining a parameter related to a resistivity of the earth formation based on a current through the measurement electrode.

11. The method of claim 10, wherein adjusting at least one of the current and the voltage includes reducing the current flow through the shielding electrode to zero.

12. The method of claim 10, wherein the parameter is selected from the current through the measurement electrode, a resistance of the measurement electrode, an apparent resistivity of the formation, and a resistivity of the formation.

13. The method of claim 10, wherein adjusting at least one of the current and the voltage includes maintaining the voltages applied to the measurement electrode and the shielding electrode at a substantially equal measurement voltage.

14. The method of claim 13, wherein adjusting at least one of the current and the voltage includes maintaining the guard voltage at a constant value, and adjusting the measurement voltage to minimize the current flow through the shielding electrode.

15. The method of claim 13, wherein adjusting at least one of the current and the voltage includes adjusting the guard voltage relative to the measurement voltage to minimize the current flow through the shielding electrode.

16. A computer program product comprising machine readable instructions stored on a non-transitory machine readable media, the instructions for measuring a resistivity parameter of an earth formation, by implementing a method comprising:
    emitting a measurement current into the earth formation by applying a first electrical source to a measurement electrode;
    focusing the measurement current by applying a guard current to a guard electrode via a second electrical source;

shielding the measurement electrode from the guard electrode by applying a third electrical source to a shielding electrode interposed between the measurement electrode and the guard electrode, the shielding electrode connected to an electric measuring device, the third electrical source being electrically connected to the shielding electrode and independent from the first electrical source and the second electrical source;

independently adjusting at least one of a current and a voltage supplied by the first electrical source and the second electrical source in response to a current in the shielding electrode measured by the electric measuring device to minimize a current flow through the shielding electrode; and determining by a processor a parameter related to the resistivity of the earth formation based on a current through the measurement electrode.

17. The computer program product of claim 16, wherein the parameter is selected from the current through the measurement electrode, a resistance of the measurement electrode, an apparent resistivity of the formation, and a resistivity of the formation.

18. The computer program product of claim 16, wherein adjusting at least one of a current and a voltage includes maintaining the voltages applied to the measurement electrode and the shielding electrode at a substantially equal measurement voltage.

19. The computer program product of claim 18, wherein adjusting at least one of the current and the voltage includes maintaining the guard voltage at a constant value, and adjusting the measurement voltage to minimize the current flow through the shielding electrode.

20. The computer program product of claim 18, wherein adjusting at least one of the current and the voltage includes adjusting the guard voltage relative to the measurement voltage to minimize the current flow through the shielding electrode.

* * * * *